United States Patent

[11] 3,630,346

[72] Inventor Carl B. Burnside
   Indianapolis, Ind.
[21] Appl. No. 42,527
[22] Filed June 1, 1970
[45] Patented Dec. 28, 1971
[73] Assignee Eli Lilly and Company
   Indianapolis, Ind.
   Continuation of application Ser. No.
   636,451, May 5, 1967, now abandoned.
   This application June 1, 1970, Ser. No.
   42,527

[54] COMPONENTS FOR MAKING A STRIP PACKAGE
   3 Claims, 5 Drawing Figs.
[52] U.S. Cl. .................................................. 206/56 AB,
   206/42
[51] Int. Cl. ..................................................... B65d 83/04
[50] Field of Search .......................................... 206/56 AB,
   42

[56] References Cited
   UNITED STATES PATENTS
   3,288,280  11/1966  Bostrom .................... 206/56 AB
   3,054,679  9/1962   Bradford ............... 206/56 AB UX
   3,049,224  8/1962   Fredette et al. ............... 206/42
   2,940,884  6/1960   White ..................... 206/56 AB X Primary Examiner—Leonard Summer
Attorneys—Everet F. Smith and Houston L. Swenson ABSTRACT: A method of packaging small articles in individual plastic blisters with the containers being integrally connected to form a strip package. The backside or label of the strip package is prepared by removing portions of a protective paper or foil cover to expose areas of a pressure-sensitive adhesive which is then positioned over the blisters to form the strip package.

INVENTOR.
CARL B. BURNSIDE

BY

ATTORNEY

COMPONENTS FOR MAKING A STRIP PACKAGE

CROSS-REFERENCE TO RELATED APPLICATION

This application is a continuation of my copending prior U.S. application, Ser. No. 636,451, filed on May 5, 1967, now abandoned.

BACKGROUND OF THE INVENTION

One of the more recent innovations in the packaging field has been the individual packaging and labeling of small articles as opposed to placing all of the articles in one container. One form of this unit-packaging method has often been referred to as strip packaging and generally embodies paper and/or plastic film materials. In particular, small articles such as individual electrical components, individual servings of jelly or other foods, and pharmaceutical products have been individually sealed in paper or plastic strips comprising two layers. One layer of these plastic strips usually comprises a transparent plastic material such as polystyrene, vinyl, polyethylene or like plastic material that has been formed into integrally connected recesses or receptacles, each being adapted to hold a single article. The outer layer of these strips is usually formed from a flat sheet material such as lightweight, plastic-coated paperboard or a plastic material which may be heat sealed, high frequency or sonic welded to the first part. These types of packages have been particularly effective in displaying, protecting and dispensing the articles. But they have had limitations in that the articles are sealed between the two parts by a method that requires specialized equipment and which frequently discourages the manufacturer of the article from personally packaging his products. Instead, the manufacturer often elects to forward his goods to a specialty contract packaging company. It is apparent that if the manufacturer or distributor of the articles can economically seal the articles in the strip packages considerable savings in time and money will be obtained from the elimination of transportation to and from a specialty packaging company.

BRIEF DESCRIPTION OF THE INVENTION

The invention described herein relates to a method for sealing articles in strip packages without the use of any expensive or complicated machinery. In particular, the method of this invention includes the steps of removing selective portions of a protective sheet backing from another paper or foil backing having a layer of a pressure-sensitive adhesive, the total of which may be referred to as the label strip. The protective backing is removed in a manner whereby the portions remaining on the label strip coincide totally and in alignment with perforated sections forming the recesses in the strip of preformed plastic material commonly referred to as blisters or cavities. Thus, when the protective backing has been partially removed, the label strip with the exposed pressure-sensitive adhesive is placed on the strip of plastic material having recesses which contain the articles to be packaged. The portions of the protective backing remaining on the label strip prevent the packaged articles from being in contact with the pressure-sensitive adhesive. It is therefore possible for the articles to be individually packaged in strip packages without the use of any expensive equipment.

This method of strip packaging has been found to be particularly attractive to the hospital industry where the dispensing of medicaments packaged in individual dosages is preferable to those packaged in bulk quantities. In such instances the hospital can stock supplies of plastic strips with recesses for holding tablets, capsules, powders, suppositories and other medicaments and supplies. The medicaments may be placed in the plastic strip recesses and then strip labels having precut protective backings may be fixed onto the plastic strips once the pressure-sensitive adhesive is exposed. By merely having a supply of recess-containing plastic strips and strip labels bearing the identity of the medicaments, the hospital can readily package individual dosages of a great variety of medicaments well in advance of their dispensement.

DESCRIPTION OF THE PREFERRED EMBODIMENT

Figure 1:
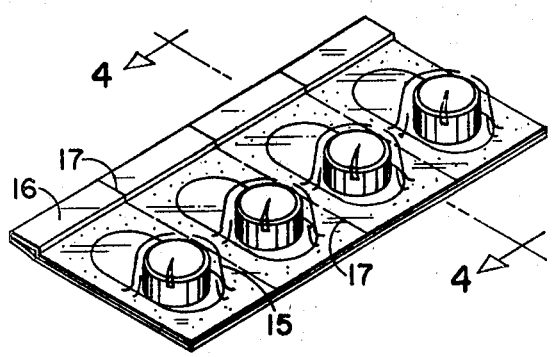
FIG. 1 is a perspective view of the strip package containing tablets which has been assembled in accordance with the method of this invention and is representative of its use for packaging a wide variety of items.
Figure 4:
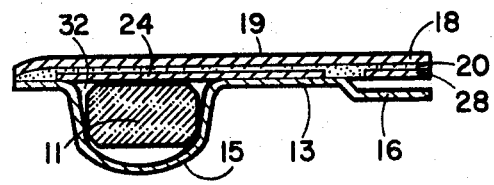
FIG. 4 is a side view in cross section along line 4—4 of FIG. 1.

Referring to FIGS. 1 and 4, the illustrated package formed in accordance with the invention described herein contains individually sealed pharmaceutical tablets 11. However, it is to be understood that other articles can be individually packaged by making corresponding changes in the contour of the package. The strip package has a first part 13 which is in the form of a transparent plastic strip having blisters or recesses 15. Recesses 15 may conform closely to the configuration of the articles to be packaged following standard packaging practices. A variety of plastic materials may be used such as acetate, butyrate, polyvinyl chloride, polystyrene, polyethylene, polypropylene or other like plastic materials which may be vacuum or pressure-formed over a mold to obtain the desired configurated recesses. These cavities may also be injection-molded, if desired. Plastic strip 13, if desired, may have an offset portion 16 along one longitudinal edge for purposes explained later. Perforations 17 which form tear lines are formed in plastic strip 13 between recesses 15. As shown in FIG. 4, a label strip 18 of sheet material such as paper, foil or a plastic material is fixed to the plastic strip 13 for maintaining each tablet in its recess. Label strip 18 has a layer of pressure-sensitive adhesive 20 on its surface and on top of the adhesive is a protective backing 22 (FIG. 3) formed from paper or a similar flexible material which may be faced with silicone or another commonly used release agent, not shown. Outer surface 19 of the label strip (not shown in the drawing) may contain printed information such as product identification, control number, size, strength and weight.

Figure 2:
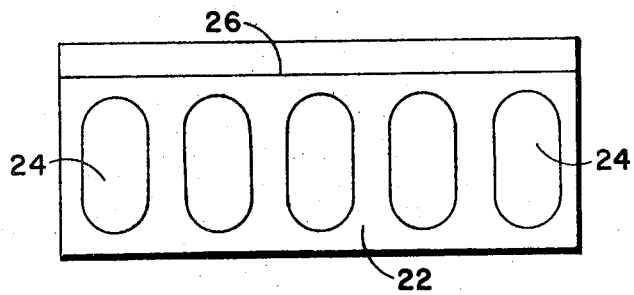
FIG. 2 is a bottom view of a label strip with a protective backing which has been precut.
Figure 3:
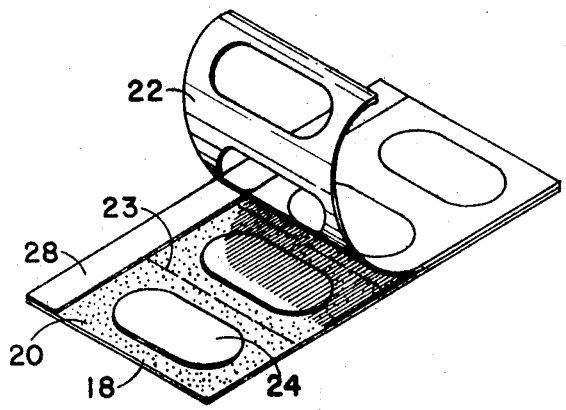
FIG. 3 is a perspective view of a label strip showing a portion of the protective backing partially removed to expose the pressure-sensitive adhesive.

With reference to FIGS. 2 and 3, the protective backing 22 has been cleanly precut to provide a series of elongated cutouts 24. The configuration of these cutouts need not necessarily coincide exactly with the peripheries of the recesses in plastic strip 13. However, cutouts 24 should at least circumscribe the peripheries of recesses 15. Thus, in the particular embodiment, elongated cutouts 24 are designed for capsules but are also suitable for circular and elliptical tablets and other dosage forms packaged in this manner. In addition to having cutouts 24, protective backing 22 has a line 26 which has been precut along one longitudinal edge to coincide with offset portion 16 on the plastic strip 13.

Thus, the particular materials to be supplied to the firm or hospital desiring to package its own articles comprises plastic strip 13 with a plurality of recesses separated by perforations 17 and the label strip 18 having a layer of pressure-sensitive adhesive 20 and protective backing 22. The label strip 18 has perforations 23 to coincide with perforations 17 in the plastic strip 13. In employing these elements for performing the method of this invention the articles to be packaged, which in this instance are tablets 11, are first placed in recesses 15. The label strip 18 with its protective backing is then readied for application on the filled recesses. Protective backing 22 is peeled off the label strip as shown in FIG. 3 to expose adhesive 20. It is noted that the backing is only partially removed since the cutouts 24 remain on the adhesive as well as strip 28 formed by precut line 26. Although not essential, it is desirable that perforations 23 on label strip 18 do not extend through backing 22, thereby facilitating its removal. When the nowapertured protective backing 22 has been removed the label strip 18 may be placed onto the plastic strip 13 whereby cutouts 24 cover openings 32 of recesses 15. The lines formed by perforations 17 and 23 will coincide. The packaging of the individual articles is now complete.

Figure 5:
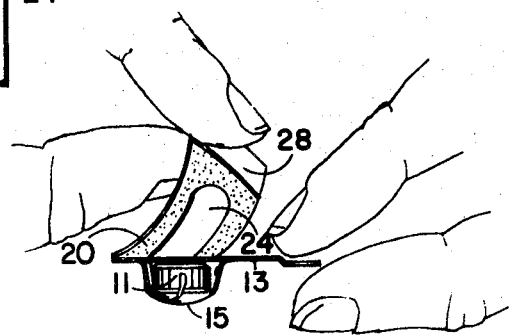
FIG. 5 is a side view of a single dosage of the medicament with an individual label strip partially removed.

In dispensing medicaments in hospitals this method of packaging is particularly desirable and can be substituted for the method of dispensing tablets in souffle cups. Once the tablets are sealed in their respective recesses the doctor or nurse need merely tear off one individual package segment containing a tablet and then carry it to the patient. The perforated precut lines 17 and 23 formed in both the plastic strip 13 and the label strip 18 facilitate the separation of the individual package segments. To remove the tablet the label strip is lifted off by starting at the protective backing 28 which is spaced from and/or unsealed to the offset portion 16 of plastic strip 13 (FIG. 5). The tablet remains in its recess 15 and is directly dispensed to the patient by simply tilting it.

Thus, the tablet has not been unnecessarily exposed to the atmosphere nor has it been touched by the nurse's hands. The portion of label strip 18 that is removed from a segment containing a tablet may also be used to record the dispensing of the tablet. If the strip has been printed in advance with the complete identity of the medicament, it need now merely be placed on the patient's chart and the identity and quantity of dosage dispensed are thereby recorded. Although this removed portion as shown in FIG. 5 will still bear protective backing segments 24 and 28, it will also bear adhesive 20 which is sufficient for the label portion to adhere to a chart. Medication errors resulting from the commonly practiced procedure of transferring tablets from bottles to souffle cups and then to the patient accompanied with a loss identifying card can be eliminated by this method.

Although only one embodiment of this invention has been illustrated and described, it will be apparent to those skilled in the art that other modifications can be made without departing from the spirit of the invention and the scope of the appended claims.

I claim:

1. A pair of packaging components adapted for manually packaging solid medication into integrally connected individual sealed plastic blisters comprising:
    a strip of plastic material having a plurality of recesses for receiving said solid medication,
    a label strip substantially congruent to said plastic strip material and bearing a succession of like drug indicia on a first surface, said label strip being formed of a tearable and flexible material,
    a coating of pressure-sensitive adhesive covering the opposite surface of said label strip,
    a protective backing on said adhesive coating of said label strip, said backing being precut in a pattern conforming with said recesses in said plastic strip material and defining a removable border area to expose portions of said adhesive coating to be removably affixed to the plastic surface area circumscribing said recesses,
    a succession of perforations extending through said plastic strip between said recesses and coinciding perforations extending only through said label strip affixed to said protective backing to enable separation of an assembled plastic strip and label strip into individual dosages upon preassembly removal of said precut protective backing border area.

2. A pair of packaging components as defined in claim 1, in which said precut pattern on said protective backing includes a longitudinal cut parallel to one edge thereof.

3. A pair of packaging components as defined in claim 2 in which said plastic strip material has an offset longitudinal area along one edge coinciding with the protective backing area defined by said longitudinal cut.

* * * * *